(12) United States Patent
Li et al.

(10) Patent No.: US 12,264,654 B2
(45) Date of Patent: Apr. 1, 2025

(54) ENERGY STORAGE DEVICE AND POWER GENERATION FLOOR WITH THE SAME

(71) Applicant: Shanghai Yinsheng Technology Co., Ltd., Shanghai (CN)

(72) Inventors: Yinsheng Li, Shanghai (CN); Pengfei Qin, Shanghai (CN)

( * ) Notice: Subject to any disclaimer, the term of this patent is extended or adjusted under 35 U.S.C. 154(b) by 0 days.

(21) Appl. No.: 17/613,952

(22) PCT Filed: Aug. 9, 2021

(86) PCT No.: PCT/CN2021/111553
§ 371 (c)(1),
(2) Date: Nov. 24, 2021

(87) PCT Pub. No.: WO2022/205724
PCT Pub. Date: Oct. 6, 2022

(65) Prior Publication Data
US 2023/0332579 A1 Oct. 19, 2023

(30) Foreign Application Priority Data
Mar. 29, 2021 (CN) .......................... 202110334771.4

(51) Int. Cl.
*F03G 1/06* (2006.01)
*F03G 1/02* (2006.01)
*F03G 1/08* (2006.01)

(52) U.S. Cl.
CPC .............. *F03G 1/06* (2013.01); *F03G 1/022* (2021.08); *F03G 1/08* (2013.01)

(58) Field of Classification Search
CPC ... F03G 1/00; F03G 1/022; F03G 1/06; F03G 1/08
See application file for complete search history.

(56) References Cited

U.S. PATENT DOCUMENTS

| | | | | |
|---|---|---|---|---|
| 1,384,426 | A * | 7/1921 | Burton | F03G 1/00 185/37 |
| 2,844,217 | A * | 7/1958 | Klosner | F03G 1/00 185/37 |
| 5,590,741 | A * | 1/1997 | Storms | F03G 1/08 185/10 |
| 2011/0186384 | A1* | 8/2011 | Vega | F03G 1/02 185/37 |
| 2018/0048214 | A1* | 2/2018 | Wu | F03G 7/08 |

FOREIGN PATENT DOCUMENTS

| | | | |
|---|---|---|---|
| DE | 202016002454 U1 | * | 12/2016 |
| KR | 20180050720 A | * | 5/2018 |

* cited by examiner

*Primary Examiner* — Phillip A Johnson

(57) ABSTRACT

The invention discloses an energy storage device, comprising a mounting seat, a first spring energy storage component, a second spring energy storage component, a one-way limiter, a transmission component, and a generator; the first spring energy storage component comprises a first rotating shaft, a first spring, and a first spring barrel; the second spring energy storage component comprises a second rotating shaft, a second spring, and a second spring barrel. The device uses two spring energy storage components to collect the gravitational potential energy of different dispersion points at the same time, and store it in the corresponding spring, then through the action of the one-way limiter, the energy of the spring with larger energy storage can be released and converted into electrical energy.

10 Claims, 5 Drawing Sheets

ENERGY STORAGE DEVICE AND POWER GENERATION FLOOR WITH THE SAME

BACKGROUND OF THE INVENTION

1. Field of the Invention

The invention relates to the field of power generation floors, in particular to an energy storage device and a power generation floor with the same.

2. Description of the Related Art

In related technologies, some power generation floors use the mechanical deformation of piezoelectric ceramics to convert electrical energy to generate electricity. The structural feature is that one end of the piezoelectric ceramic sheet is fixed on the bottom plate, and the other end of the piezoelectric ceramic is suspended. The bottom plate is fixed with a mechanical limiting structure that limits the distance of the upper pedal panel down, and the bottom of the pedal panel is fixed at a position directly opposite the piezoceramic suspended end. When the human body's potential energy presses down on the pedal panel, the pedal panel squeezes the suspended end of the piezoelectric ceramics to deform the piezoelectric ceramics to generate weak electricity and store it in the battery. At the same time, the mechanical limiting structure restricts the descending distance of the pedal panel to ensure that the deformation of the piezoelectric ceramic is within the rated deformation range. In this structural form, the effective displacement distance of the pedal panel cannot be very large, and the deformation of the piezoelectric ceramic itself is very small; therefore, the human body's gravitational potential energy collected by the deformation of piezoelectric ceramics is very small, the potential energy collection efficiency is extremely low, and the cost of piezoelectric ceramics is very high; as a result, this kind of power generation floor can only be used as exhibition products at present, and it is difficult to be widely used on a large scale. Therefore, it is necessary to design a new structure of gravity potential energy collection and conversion device.

SUMMARY OF THE INVENTION

The invention aims to solve at least one of the technical problems existing in the prior art. To this end, one purpose of the invention is to provide an energy storage device.

Another purpose of the invention is to provide a power generation floor with the above energy storage device.

An energy storage device, comprising a mounting seat, a first spring energy storage component, a second spring energy storage component, a one-way limiter, a transmission component, and a generator; the first spring energy storage component comprises a first rotating shaft, a first spring, and a first spring barrel; the first rotating shaft can be rotatably mounted in one direction on the mounting seat; the first spring is sleeved on the first rotating shaft; the first spring barrel is covered on the first spring; the inner end of the first spring is connected to the first rotating shaft, and the outer end thereof is connected to the first spring barrel; the first spring barrel is rotatably mounted on the mounting seat; the first rotating shaft can rotate to wind up the first spring; the first spring can drive the first spring barrel to rotate; the second spring energy storage component comprises a second rotating shaft, a second spring, and a second spring barrel; the second rotating shaft can be rotatably mounted in one direction on the mounting seat; the second spring is sleeved on the second rotating shaft; the second spring barrel is covered on the second spring; the inner end of the second spring is connected to the second rotating shaft, and the outer end thereof is connected to the second spring barrel; the second spring barrel is rotatably mounted on the mounting seat; the second rotating shaft can rotate to wind up the second spring; the second spring can drive the second spring barrel to rotate; the one-way limiter is arranged on the mounting seat; the one-way limiter is configured for that when the stored energy of the first spring is greater than the stored energy of the second spring, the one-way limiter fixes the second spring barrel, and when the stored energy of the second spring is greater than the stored energy of the first spring, the one-way limiter fixes the first spring barrel; the first spring barrel and the second spring barrel are both connected to the transmission component and drive a motor shaft of the generator to rotate through the transmission component.

Further, a first one-way bearing is provided between the first rotating shaft and the mounting seat; a second one-way bearing is provided between the second rotating shaft and the mounting seat.

Further, the first spring barrel is provided with a first gear; the second spring barrel is provided with a second gear; the transmission component comprises a third gear, a fourth gear, and a transmission shaft; the transmission shaft is rotatably mounted on the mounting seat and connected to the motor shaft; the third gear and the fourth gear can both be rotatably mounted in one direction on the transmission shaft; the first gear meshes with the third gear; the second gear meshes with the fourth gear; when the first spring barrel rotates, the first gear drives the third gear to rotate and thus drives the transmission shaft to rotate, and the fourth gear does not rotate; when the second spring barrel rotates, the second gear drives the fourth gear to rotate and thus drives the transmission shaft to rotate, and the third gear does not rotate.

Further, a third one-way bearing is provided between the third gear and the transmission shaft; a fourth one-way bearing is provided between the fourth gear and the transmission shaft.

Further, one end of the transmission shaft is provided with a first bevel gear; the motor shaft is provided with a second bevel gear; the first bevel gear meshes with the second bevel gear.

Further, the one-way limiter is a limiting ball; the mounting seat is provided with a sliding through hole; the limiting ball is arranged in the sliding through hole and can reciprocate along the axial direction of the sliding through hole; the first gear is located on the axial side of the sliding through hole, and the second gear is located on the other axial side of the sliding through hole; the surface of the first gear close to the sliding through hole is provided with a first limiting hole, and the surface of the second gear close to the sliding through hole is provided with a second limiting hole; a part of the limiting ball is located in the sliding through hole, and the other part thereof is located in the first limiting hole or the second limiting hole to fix the first gear or the second gear.

Further, the mounting seat comprises a connecting plate, a first mounting plate, a second mounting plate, and a middle partition plate; the first mounting plate and the second mounting plate are oppositely arranged and spaced apart; the middle partition plate is arranged between the first mounting plate and the second mounting plate; the connecting plate is respectively connected to the first mounting plate, the second mounting plate, and the third mounting plate; the middle partition plate is provided with the sliding through hole; the first spring and the first spring barrel are arranged between the first mounting plate and the middle partition plate; the first rotating shaft is rotatably connected to the first mounting plate; the first spring barrel is rotatably connected to the middle partition plate; the first gear is arranged on a surface of the first spring barrel close to the middle partition plate; the second spring and the second spring barrel are arranged between the second mounting plate and the middle partition plate; the second rotating shaft is rotatably connected to the second mounting plate; the second spring barrel is rotatably connected to the middle partition plate; the second gear is arranged on a surface of the second spring barrel close to the middle partition plate; the transmission shaft is respectively rotatably connected to the first mounting plate and the second mounting plate.

Further, a part of the limiting ball is located in the first limiting hole, the limiting ball is tangent to the side surface of the second gear close to the middle partition plate; when a part of the limiting ball is located in the second limiting hole, the limiting ball is tangent to the side surface of the first gear close to the middle partition plate.

Further, one end of the first rotating shaft close to the middle partition plate is provided with a first groove; the first spring barrel and the first gear are provided with a first through hole; one end of the second rotating shaft close to the middle partition plate is provided with a second groove; the second spring barrel and the second gear are provided with a second through hole; the middle partition plate is fixedly provided with a central shaft; one end of the central shaft extends into the first groove through the first through hole, and the other end thereof extends into the second groove through the second through hole.

A power generation floor, comprising the above energy storage device.

Compared with the prior art, the advantageous effects of the invention are as follows:

Different from the existing power generation floor field that uses the tiny mechanical deformation of piezoelectric ceramics to convert into electrical energy, the applicant here provides a new way and ingeniously to provide a new form of potential energy collection and conversion of electrical energy. The device uses two spring energy storage components to collect the gravitational potential energy of different dispersion points at the same time, and store it in the corresponding spring, then through the action of the one-way limiter, the energy of the spring with larger energy storage can be released and converted into electrical energy. During the release process, the two spring energy storage components can also continue to accumulate energy at the same time and carry out a new round of comparison and release, which can more fully convert the gravitational potential energy into electrical energy, and the collection and conversion efficiency is higher. It can replace the power generation mode of piezoelectric ceramics, reduce the comprehensive cost of the gravitational potential energy power generation method, and realize more efficient collection and utilization of gravitational potential energy and energy conversion.

The additional aspects and advantages of the invention will be partly given in the following description, and partly will become obvious from the following description, or be understood through the practice of the invention.

BRIEF DESCRIPTION OF THE DRAWINGS

In order to explain the embodiments of the invention or the technical solutions in the prior art more clearly, the drawings that need to be used in the description of the embodiments or the prior art will be introduced hereinafter. Obviously, the drawings in the following description are only some embodiments of the invention. For those of ordinary skill in the art, other drawings may be obtained from these drawings without creative efforts.

Figure 1:
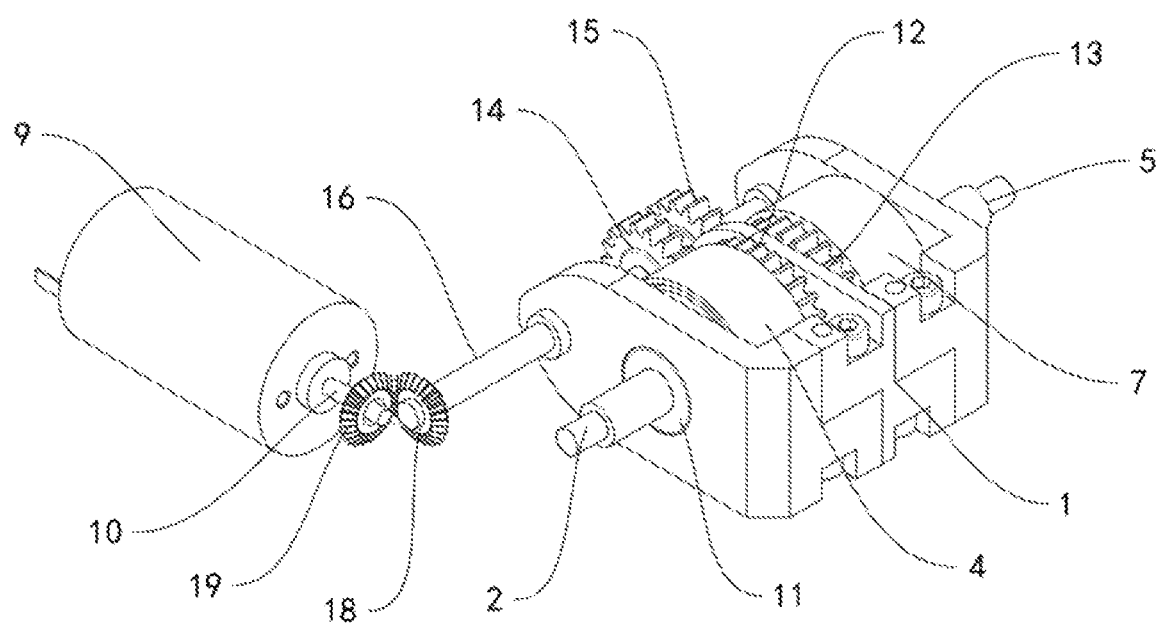
FIG. 1 is a perspective view of the invention.

REFERENCE SIGNS 1 refers to the mounting seat; 2 refers to the first rotating shaft; 3 refers to the first spring; 4 refers to the first spring barrel; 5 refers to the second rotating shaft; 6 refers to the second spring; 7 refers to the second spring barrel; 8 refers to the one-way limiter; 9 refers to the generator; 10 refers to the motor shaft; 11 refers to the first one-way bearing; 12 refers to the first gear; 13 refers to the second gear; 14 refers to the third gear; 15 refers to the fourth gear; 16 refers to the transmission shaft; 17 refers to the third one-way bearing; 18 refers to the first bevel gear; 19 refers to the second bevel gear; 20 refers to the sliding through hole; 21 refers to the first limiting hole; 22 refers to the second limiting hole; 23 refers to the connecting plate; 24 refers to the first mounting plate; 25 refers to the second mounting plate; 26 refers to the middle partition plate; 27 refers to the first groove; 28 refers to the first through hole; 29 refers to the central shaft.

DETAILED DESCRIPTION OF THE PREFERRED EMBODIMENTS

In order to make the objectives, technical solutions, and advantages of the embodiments of the invention clearer, the technical solutions in the embodiments of the invention will be described clearly and completely hereinafter with reference to the drawings in the embodiments of the invention. Obviously, the described embodiments are part of the embodiments of the invention, rather than all of the embodiments. Based on the embodiments of the invention, all other embodiments obtained by those of ordinary skill in the art without creative work shall all fall within the protection scope of the invention.

The embodiments of the invention are described in detail hereafter. Examples of the embodiments are shown in the accompanying drawings, in which the same or similar reference numerals indicate the same or similar elements or elements with the same or similar functions. In the description of the invention, it should be understood that the orientation or positional relationship indicated by the terms "upper", "lower", "front", "back", "left", "right", "inner", "outer", "vertical", "circumferential", "radial", "axial", etc. are based on the orientation or positional relationship shown in the drawings, and is only for the convenience of describing the invention and simplifying the description, but not indicate or imply that the pointed device or element must have a specific orientation, be constructed and operated in a specific orientation, and therefore cannot be understood as a limitation of the invention.

In the invention, unless otherwise clearly defined and limited, the terms "installed", "connected", "fixed" and other terms should be interpreted broadly; for example, it can be a fixed connection, a detachable connection or an integral connection; it can be a mechanical connection or an electrical connection; it can be a direct connection or an indirect connection through an intermediary, and it can be a connection between two components. For those of ordinary skill in the art, the specific meanings of the above terms in the invention can be understood according to specific circumstances.

In the description of the invention, "first feature" and "second feature" may include one or more of these features. In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features.

With reference to FIG. 1 to FIG. 5, an energy storage device is described hereinafter, comprising a mounting seat 1, a first spring energy storage component, a second spring energy storage component, a one-way limiter 8, a transmission component, and a generator 9.

Figure 3:
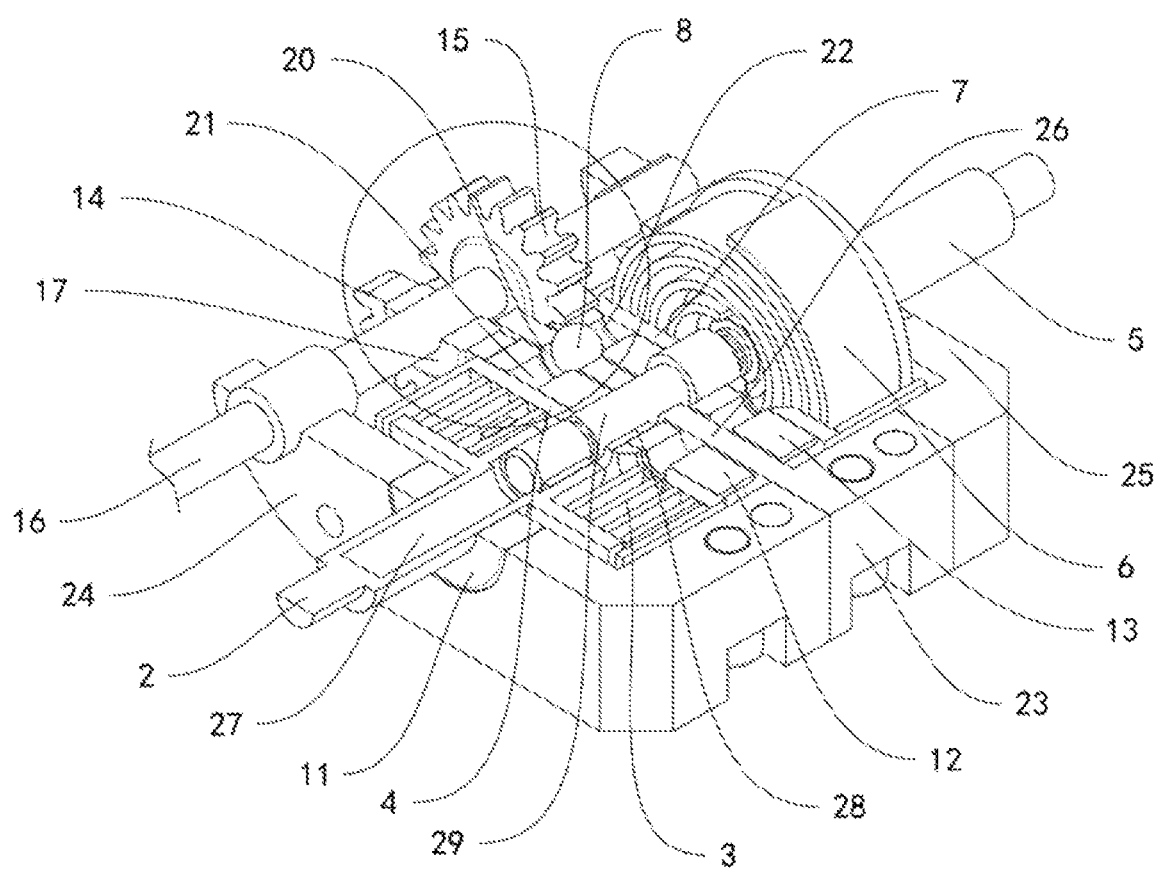
FIG. 3 is a cross-sectional perspective view of the invention.
Figure 4:
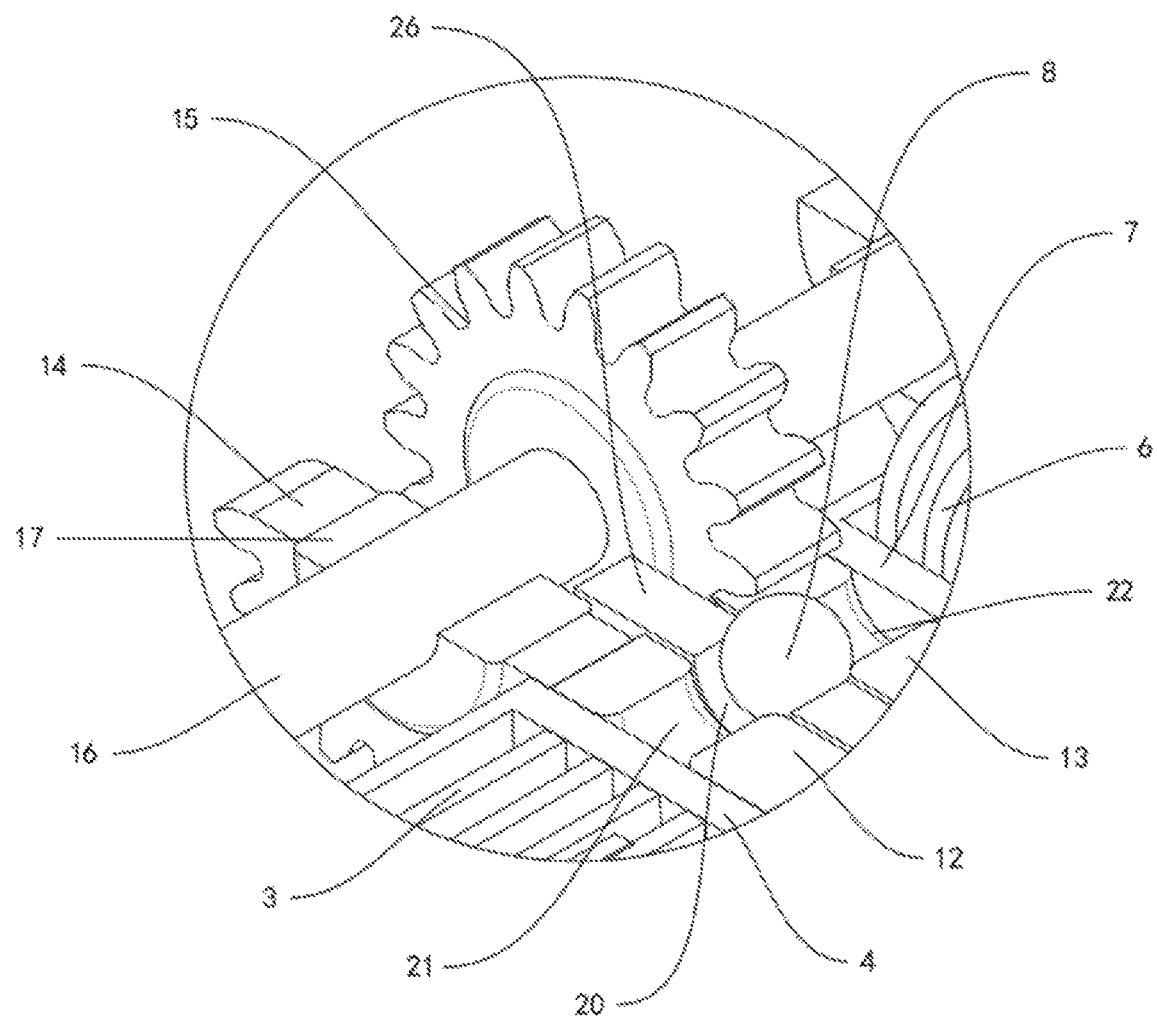
FIG. 4 is an enlarged view of the circled part in FIG. 3.
Figure 5:
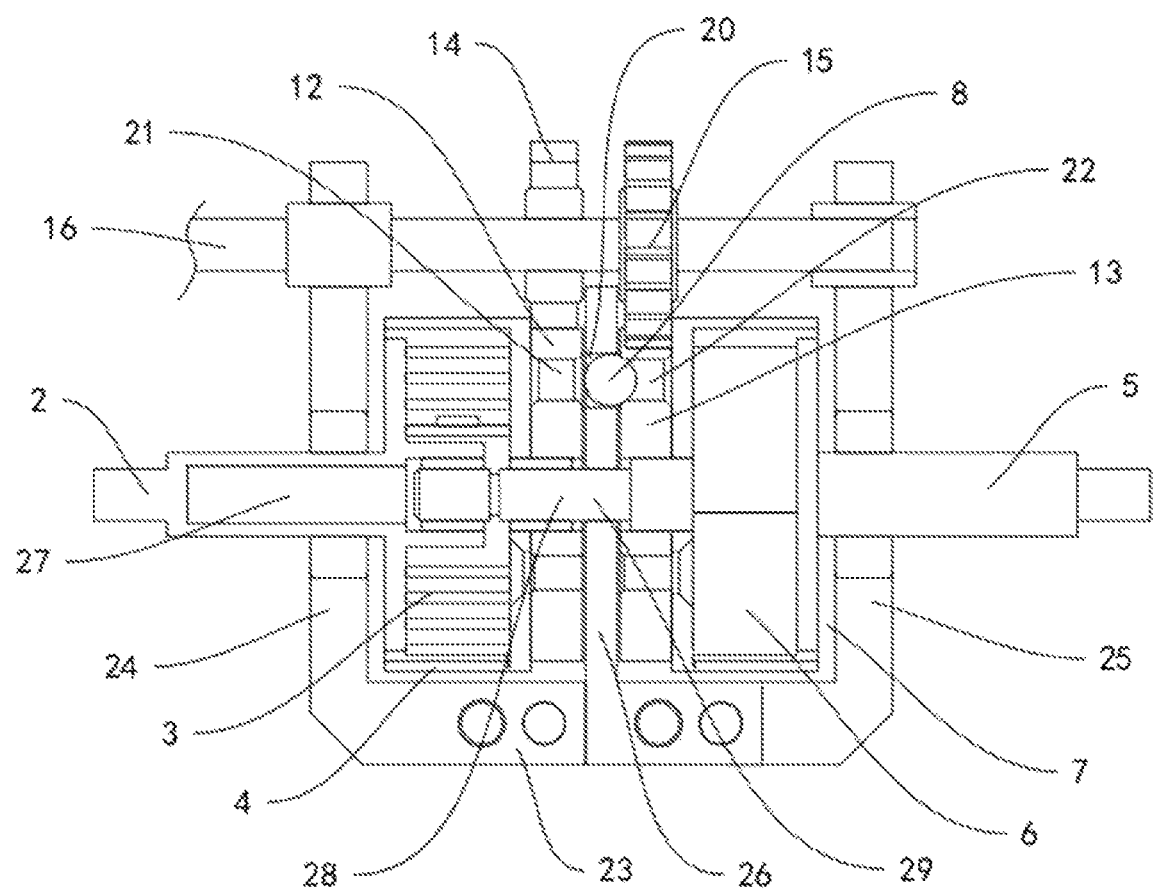
FIG. 5 is a top view of FIG. 3.

As shown in FIG. 3 to FIG. 5, the first spring energy storage component comprises a first rotating shaft 2, a first spring 3, and a first spring barrel 4; the first rotating shaft 2 can be rotatably mounted in one direction on the mounting seat 1; the first spring 3 is sleeved on the first rotating shaft 2; the first spring barrel 4 is covered on the first spring 3; the inner end of the first spring 3 is connected to the first rotating shaft 2, and the outer end thereof is connected to the first spring barrel 4; the first spring barrel 4 is rotatably mounted on the mounting seat 1; the first rotating shaft 2 can rotate to wind up the first spring 3; the first spring 3 can drive the first spring barrel 4 to rotate.

Specifically, since the first rotating shaft 2 can only rotate in one direction, when the first rotating shaft 2 rotates, only the first spring 3 will be wound up, so as to convert the rotational kinetic energy into the elastic potential energy of the first spring 3 and store it. After the first spring 3 is wound up, it will drive the first spring barrel 4 to rotate in the process of releasing the elastic potential energy.

The second spring energy storage component comprises a second rotating shaft 5, a second spring 6, and a second spring barrel 7; the second rotating shaft 5 can be rotatably mounted in one direction on the mounting seat 1; the second spring 6 is sleeved on the second rotating shaft 5; the second spring barrel 7 is covered on the second spring 6; the inner end of the second spring 6 is connected to the second rotating shaft 5, and the outer end thereof is connected to the second spring barrel 7; the second spring barrel 7 is rotatably mounted on the mounting seat 1; the second rotating shaft 5 can rotate to wind up the second spring 6; the second spring 6 can drive the second spring barrel 7 to rotate.

Specifically, since the second rotating shaft 5 can only rotate in one direction, when the second rotating shaft 5 rotates, only the second spring 6 will be wound up, so as to convert the rotational kinetic energy into the elastic potential energy of the second spring 6 and store it. After the second spring 6 is wound up, it will drive the second spring barrel 7 to rotate in the process of releasing the elastic potential energy.

As shown in FIG. 3 to FIG. 5, the one-way limiter 8 is arranged on the mounting seat 1; the one-way limiter 8 is configured for that when the stored energy of the first spring 3 is greater than the stored energy of the second spring 6, the one-way limiter 8 fixes the second spring barrel 7, and when the stored energy of the second spring 6 is greater than the stored energy of the first spring 3, the one-way limiter 8 fixes the first spring barrel 4; the first spring barrel 4 and the second spring barrel 7 are both connected to the transmission component and drive a motor shaft 10 of the generator 9 to rotate through the transmission component.

The following describes the working principle of the device in detail when the device is applied to the power generation floor.

The power generation floor is usually provided with a base and a pedal plate that is installed on the base and can swing up and down. The device is installed on the base, and the first rotating shaft 2 and the second rotating shaft 5 are connected to the pedal plate through the transmission mechanism. When the user steps on the pedal, the pedal will swing downward and the transmission mechanism drives the first rotating shaft 2 and the second rotating shaft 5 to rotate, so as to convert the gravitational potential energy of the human body into the rotational kinetic energy of the first rotating shaft 2 and the second rotating shaft 5.

It is understandable that when the pedal plate is swinging downward, the downward displacement degree of different position points is different, which will cause the rotation kinetic energy of the first rotating shaft 2 and the second rotating shaft 5 to be different, so as to cause the energy stored in the first spring 3 and the second spring 6 to be different. While the device is provided with a one-way limiter 8, and the one-way limiter 8 can fix the spring barrel with a small energy storage, so that the spring barrel with a large energy storage can be rotated to release the elastic potential energy for conversion into electrical energy. During the release process, through the human body continuing to step on the pedal, the first spring 3 and the second spring 6 can also continue to accumulate energy at the same time, perform a new round of energy comparison, and release the more energy-storage spring energy to convert into electrical energy.

In summary, different from the existing power generation floor field that uses the tiny mechanical deformation of piezoelectric ceramics to convert into electrical energy, the applicant here provides a new way and ingeniously to provide a new form of potential energy collection and conversion of electrical energy. The device uses two spring energy storage components to collect the gravitational potential energy of different dispersion points at the same time, and store it in the corresponding spring, then through the action of the one-way limiter, the energy of the spring with larger energy storage can be released and converted into electrical energy. During the release process, the two spring energy storage components can also continue to accumulate energy at the same time and carry out a new round of comparison and release, which can more fully convert the gravitational potential energy into electrical energy, and the collection and conversion efficiency is higher. It can replace the power generation mode of piezoelectric ceramics, reduce the comprehensive cost of the gravitational potential energy power generation method, and realize more efficient collection and utilization of gravitational potential energy and energy conversion.

It is understandable that the energy storage device of the invention can realize the collection and power generation of the gravitational potential energy of the power generation floor, and can also be used for various forms and multiple locations of energy collection for power generation in other fields, and the application mode and scope are broader and more flexible.

The specific structure of the device will be introduced in detail hereinafter.

Figure 2:
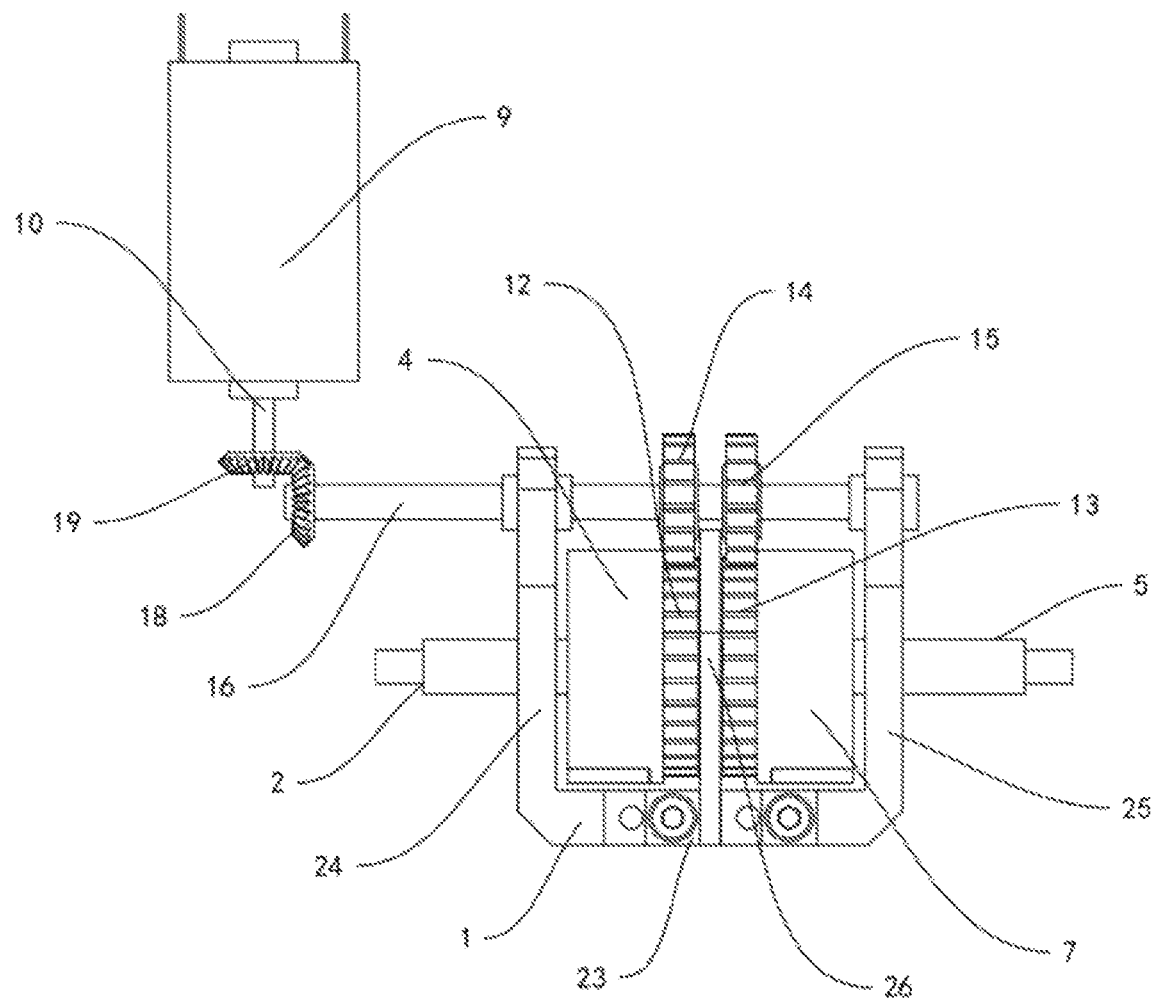
FIG. 2 is a top view of FIG. 1.

In the embodiment, as shown in FIG. 1, FIG. 2, and FIG. 3, the mounting seat 1 comprises a connecting plate 23, a first mounting plate 24, a second mounting plate 25, and a middle partition plate 26; the first mounting plate 24 and the second mounting plate 25 are oppositely arranged and spaced apart; the middle partition plate 26 is arranged between the first mounting plate 24 and the second mounting plate 25; the connecting plate 23 is respectively connected to the first mounting plate 24, the second mounting plate 25, and the third mounting plate; the first spring 3 and the first spring barrel 4 are arranged between the first mounting plate 24 and the middle partition plate 26; the first rotating shaft 2 is rotatably connected to the first mounting plate 24; the first spring barrel 4 is rotatably connected to the middle partition plate 26; the second spring 6 and the second spring barrel 7 are arranged between the second mounting plate 25 and the middle partition plate 26; the second rotating shaft 5 is rotatably connected to the second mounting plate 25; the second spring barrel 7 is rotatably connected to the middle partition plate 26; the transmission shaft 16 is respectively rotatably connected to the first mounting plate 24 and the second mounting plate 25. Therefore, the structure is simple and easy to realize.

In the embodiment, as shown in FIG. 3, a first one-way bearing 11 is provided between the first rotating shaft 2 and the mounting seat 1 (e.g. the first mounting plate 24 above); a second one-way bearing is provided between the second rotating shaft 5 and the mounting seat 1 (e.g. the first mounting plate 24 above). Therefore, the one-way rotation of the first rotating shaft 2 and the second rotating shaft 5 can be realized.

In the embodiment, as shown in FIG. 1 and FIG. 2, the first spring barrel 4 is provided with a first gear 12; the second spring barrel 7 is provided with a second gear 13 the transmission component comprises a third gear 14, a fourth gear 15, and a transmission shaft 16; the transmission shaft 16 is rotatably mounted on the mounting seat 1 and connected to the motor shaft 10; the third gear 14 and the fourth gear 15 can both be rotatably mounted in one direction on the transmission shaft 16; the first gear 12 meshes with the third gear 14; the second gear 13 meshes with the fourth gear 15; when the first spring barrel 4 rotates, the first gear 12 drives the third gear 14 to rotate and thus drives the transmission shaft 16 to rotate, and the fourth gear 15 does not rotate; when the second spring barrel 7 rotates, the second gear 13 drives the fourth gear 15 to rotate and thus drives the transmission shaft 16 to rotate, and the third gear 14 does not rotate.

Specifically, as shown in FIG. 1 and FIG. 2, the transmission forms here all adopt gear transmission, which is stable, high in precision and reliable in transmission. The first gear 12 is arranged on a surface of the first spring barrel 4 close to the middle partition plate 26; the second gear 13 is arranged on a surface of the second spring barrel 7 close to the middle partition plate 26. In order to prevent the rotation of the first spring barrel 4 or the second spring barrel 7 from affecting the other spring barrel, the third gear 14 and the fourth gear 15 here are both rotatably mounted in one direction on the transmission shaft 16.

In the embodiment, as shown in FIG. 3, a third one-way bearing 17 is provided between the third gear 14 and the transmission shaft 16; a fourth one-way bearing is provided between the fourth gear 15 and the transmission shaft 16. Therefore, the one-way rotation of the third gear 14 and the fourth gear 15 can be realized.

In the embodiment, as shown in FIG. 1, one end of the transmission shaft 16 is provided with a first bevel gear 18; the motor shaft 10 is provided with a second bevel gear 19; the first bevel gear 18 meshes with the second bevel gear 19. Therefore, the overall structure of the device can be more compact.

In the embodiment, as shown in FIG. 3 and FIG. 4, one end of the first rotating shaft 2 close to the middle partition plate 26 is provided with a first groove 27; the first spring barrel 4 and the first gear 12 are provided with a first through hole 28; one end of the second rotating shaft 5 close to the middle partition plate 26 is provided with a second groove; the second spring barrel 7 and the second gear 13 are provided with a second through hole; the middle partition plate 26 is fixedly provided with a central shaft 29; one end of the central shaft 29 extends into the first groove 27 through the first through hole 28, and the other end thereof extends into the second groove through the second through hole.

Specifically, both axial ends of the central shaft 29 protrude from the middle partition plate 26, so that the first rotating shaft 2, the first spring barrel 4, and the first gear 12 can be sleeved on one axial end of the central shaft 29, and the second rotating shaft 5, the second spring barrel 7, and the second gear 13 can be sleeved on one axial end of the central shaft 29; therefore, the central shaft 29 can support the first rotating shaft 2, the first spring barrel 4, the first gear 12, the second rotating shaft 5, the second spring barrel 7 and the second gear 13 to realize the coaxial arrangement, which not only makes the structure compact, but also makes the components not easy to shake.

Further, in order to reduce the rotational friction, the first groove 27, the first through hole 28, the second groove, and the second through hole can be provided with a bushing, and the central shaft 29 is inserted through the bushing.

In the embodiment, as shown in FIG. 3 and FIG. 4, the one-way limiter 8 is a limiting ball; the mounting seat 1 (that is, the middle partition plate 26 above) is provided with a sliding through hole 20; the limiting ball is arranged in the sliding through hole 20 and can reciprocate along the axial direction of the sliding through hole 20; the first gear 12 is located on the axial side of the sliding through hole 20, and the second gear 13 is located on the other axial side of the sliding through hole 20; the surface of the first gear 12 close to the sliding through hole 20 is provided with a first limiting hole 21, and the surface of the second gear 13 close to the sliding through hole 20 is provided with a second limiting hole 22; a part of the limiting ball is located in the sliding through hole 20, and the other part thereof is located in the first limiting hole 21 or the second limiting hole 22 to fix the first gear 12 or the second gear 13.

Specifically, assuming that in the initial state, the energy of the first spring 3 is greater than that of the second spring 6, then the first gear 12 rotates to release the energy of the first spring 3, and its side close to the middle partition plate 26 will push the limiting ball into the second limiting hole 22 to fix the second gear 13; when the first gear 12 rotates until the first limiting hole 21 and the sliding through hole 20 are directly opposite, if the energy of the second spring 6 is greater than that of the first spring 3 at this time, then the side of the second gear 13 close to the middle partition plate 26 will push the limiting ball into the first limiting hole 21 to fix the first gear 12, and the second gear 13 will start to rotate to release the energy of the second spring 6; when the second gear 13 rotates until the second limiting hole 22 is directly opposite to the sliding through hole 20, if the energy of the first spring 3 is greater than that of the second spring 6, then the first gear 12 will push the limiting ball into the second limiting hole 22 to fix the second gear 13 again. In this way, repeat the periodic energy comparison between the first spring 3 and the second spring 6 to drive the limiting ball to move the limit by itself. It is always ensured that the high-energy clockwork releases and converts electrical energy, while the small-energy clockwork can continue to be wound up to store energy, which can effectively improve the collection and conversion efficiency of gravitational potential energy. Under this structure, the movement of the limiting ball is mechanical and automatic, which works reliably and does not require frequent maintenance.

Further, when a part of the limiting ball is located in the first limiting hole 21, the limiting ball is tangent to the side surface of the second gear 13 close to the middle partition plate 26, so as to reduce the influence of the limiting ball on the rotation of the second gear 13; when a part of the limiting ball is located in the second limiting hole 22, the limiting ball is tangent to the side surface of the first gear 12 close to the middle partition plate 26, so as to reduce the influence of the limiting ball on the rotation of the first gear 12.

Although the embodiments of the invention have been shown and described, for those of ordinary skill in the art, it can be understood that various changes, modifications, and substitutions can be made to these embodiments without departing from the principle and spirit of the invention. The protection scope of the invention is defined by the appended claims and the equivalents thereof.

The invention claimed is:

1. An energy storage device, comprising a mounting seat, a first spring energy storage component, a second spring energy storage component, a one-way limiter, a transmission component, and a generator;
   the first spring energy storage component comprises a first rotating shaft, a first spring, and a first spring barrel; the first rotating shaft is rotatably mounted in one direction on the mounting seat; the first spring is sleeved on the first rotating shaft; the first spring barrel is covered on the first spring; the inner end of the first spring is connected to the first rotating shaft, and the outer end thereof is connected to the first spring barrel; the first spring barrel is rotatably mounted on the mounting seat; rotate the first rotating shaft to wind up the first spring; the first spring drives the first spring barrel to rotate;
   the second spring energy storage component comprises a second rotating shaft, a second spring, and a second spring barrel; the second rotating shaft is rotatably mounted in one direction on the mounting seat; the second spring is sleeved on the second rotating shaft; the second spring barrel is covered on the second spring; the inner end of the second spring is connected to the second rotating shaft, and the outer end thereof is connected to the second spring barrel; the second spring barrel is rotatably mounted on the mounting seat; rotate the second rotating shaft to wind up the second spring; the second spring drives the second spring barrel to rotate;
   the one-way limiter is arranged on the mounting seat; the one-way limiter is configured for that when the stored energy of the first spring is greater than the stored energy of the second spring, the one-way limiter fixes the second spring barrel, and when the stored energy of the second spring is greater than the stored energy of the first spring, the one-way limiter fixes the first spring barrel;
   the first spring barrel and the second spring barrel are both connected to the transmission component and drive a motor shaft of the generator to rotate through the transmission component.

2. The energy storage device according to claim 1, wherein a first one-way bearing is provided between the first rotating shaft and the mounting seat; a second one-way bearing is provided between the second rotating shaft and the mounting seat.

3. The energy storage device according to claim 1, wherein the first spring barrel is provided with a first gear; the second spring barrel is provided with a second gear;
   the transmission component comprises a third gear, a fourth gear, and a transmission shaft; the transmission shaft is rotatably mounted on the mounting seat and connected to the motor shaft; the third gear and the fourth gear are both rotatably mounted in one direction on the transmission shaft; the first gear meshes with the third gear; the second gear meshes with the fourth gear;
   when the first spring barrel rotates, the first gear drives the third gear to rotate and thus drives the transmission shaft to rotate, and the fourth gear does not rotate; when the second spring barrel rotates, the second gear drives the fourth gear to rotate and thus drives the transmission shaft to rotate, and the third gear does not rotate.

4. The energy storage device according to claim 3, wherein a third one-way bearing is provided between the third gear and the transmission shaft; a fourth one-way bearing is provided between the fourth gear and the transmission shaft.

5. The energy storage device according to claim 3, wherein one end of the transmission shaft is provided with a first bevel gear; the motor shaft is provided with a second bevel gear; the first bevel gear meshes with the second bevel gear.

6. The energy storage device according to claim 3, wherein the one-way limiter is a limiting ball; the mounting seat is provided with a sliding through hole; the limiting ball is arranged in the sliding through hole and reciprocates along the axial direction of the sliding through hole;
   the first gear is located on an axial side of the sliding through hole, and the second gear is located on the other axial side of the sliding through hole; a surface of the first gear is provided with a first limiting hole, and a surface of the second gear is provided with a second limiting hole, and both the first limiting hole and the second limiting hole are connected to the sliding through hole;
   a part of the limiting ball is located in the sliding through hole, and the other part thereof is located in the first limiting hole or the second limiting hole to fix the first gear or the second gear.

7. The energy storage device according to claim 6, wherein the mounting seat comprises a connecting plate, a first mounting plate, a second mounting plate, and a middle partition plate; the first mounting plate and the second mounting plate are oppositely arranged and spaced apart; the middle partition plate is arranged between the first mounting plate and the second mounting plate; the connecting plate is respectively connected to the first mounting plate, the second mounting plate, and the third mounting plate; the middle partition plate is provided with the sliding through hole;
   the first spring and the first spring barrel are arranged between the first mounting plate and the middle partition plate; the first rotating shaft is rotatably connected to the first mounting plate; the first spring barrel is rotatably connected to the middle partition plate; the first gear is arranged between the first spring barrel and the middle partition plate;
   the second spring and the second spring barrel are arranged between the second mounting plate and the middle partition plate; the second rotating shaft is rotatably connected to the second mounting plate; the second spring barrel is rotatably connected to the middle partition plate; the second gear is arranged between the second spring barrel and the middle partition plate;

the transmission shaft is respectively rotatably connected to the first mounting plate and the second mounting plate.

8. The energy storage device according to claim 7, wherein when a part of the limiting ball is located in the first limiting hole, the limiting ball is tangent to a side surface of the second gear;

when a part of the limiting ball is located in the second limiting hole, the limiting ball is tangent to a side surface of the first gear.

9. The energy storage device according to claim 7, wherein inner end of the first rotating shaft is provided with a first groove; the first spring barrel and the first gear are provided with a first through hole; inner end of the second rotating shaft is provided with a second groove; the second spring barrel and the second gear are provided with a second through hole; the middle partition plate is fixedly provided with a central shaft; one end of the central shaft extends into the first groove through the first through hole, and the other end thereof extends into the second groove through the second through hole.

10. A power generation floor, wherein the power generation floor comprises the energy storage device according to claim 1.

* * * * *